(12) United States Patent
Tsai (10) Patent No.: US 11,463,667 B2
(45) Date of Patent: Oct. 4, 2022

(54) IMAGE PROJECTION

(71) Applicant: HEWLETT-PACKARD DEVELOPMENT COMPANY, L.P., Houston, TX (US)

(72) Inventor: Ping-Tsung Tsai, Taipei (CN)

(73) Assignee: Hewlett-Packard Development Company, L.P., Spring, TX (US)

( * ) Notice: Subject to any disclaimer, the term of this patent is extended or adjusted under 35 U.S.C. 154(b) by 360 days.

(21) Appl. No.: 16/077,216

(22) PCT Filed: Jun. 12, 2017

(86) PCT No.: PCT/US2017/037021
§ 371 (c)(1),
(2) Date: Aug. 10, 2018

(87) PCT Pub. No.: WO2018/231191
PCT Pub. Date: Dec. 20, 2018

(65) Prior Publication Data
US 2021/0211623 A1    Jul. 8, 2021

(51) Int. Cl.
*H04N 9/31* (2006.01)
*G06T 7/90* (2017.01)
(Continued)

(52) U.S. Cl.
CPC ......... *H04N 9/3194* (2013.01); *G03B 21/008* (2013.01); *G06F 3/041* (2013.01);
(Continued)

(58) Field of Classification Search
CPC .... G03B 21/005; G03B 21/006; G03B 21/28; G03B 21/147; G09G 2320/0276; G09G 2320/0666; G09G 2320/0633; G09G 2320/0686; G09G 2320/0693; G09G 3/001; G09G 3/007; G09G 3/02; G09G 3/36; H04N 9/3105; H04N 9/3108;
(Continued)

(56) References Cited

U.S. PATENT DOCUMENTS

| | | |
|---|---|---|
| 6,456,339 B1 | 9/2002 | Surati et al. |
| 6,897,999 B1 | 5/2005 | Bass et al. |

(Continued)

FOREIGN PATENT DOCUMENTS

| | | |
|---|---|---|
| CN | 1737645 | 2/2006 |
| CN | 1992912 | 7/2007 |

(Continued)

OTHER PUBLICATIONS

Kinjo et al., "Vivid Image Projection System Using E-paper Active Screen", Retrieved from internet—http://onlinelibrary.wiley.com/doi/10.1002/jsid.121/abstract, 2012, pp. 559-565.

*Primary Examiner* — Sultan Chowdhury
(74) *Attorney, Agent, or Firm* — Trop Pruner & Hu PC (57) ABSTRACT

Examples of techniques for projection of images on reflective displays is described. In an example implementation, an image is projected on a reflective display. Regions of a first predefined color of the projected image are identified, and a first set of pixels of the reflective display that overlap the identified regions is biased to display a second predefined color by the first set of pixels.

20 Claims, 5 Drawing Sheets

(51) Int. Cl.
*G06F 3/041* (2006.01)
*G03B 21/00* (2006.01)
*G06V 10/22* (2022.01)

(52) U.S. Cl.
CPC ................ *G06T 7/90* (2017.01); *G06V 10/22* (2022.01); *H04N 9/3182* (2013.01)

(58) Field of Classification Search
CPC .. H04N 9/3182; H04N 9/3185; H04N 9/3194; G06F 3/038; G06F 3/041; G06F 3/0393; G06F 3/0414
See application file for complete search history.

(56) References Cited

U.S. PATENT DOCUMENTS

| | | | |
|---|---|---|---|
| 7,466,309 B2 | 12/2008 | Hunt et al. | |
| 8,408,711 B2 | 4/2013 | Yang | |
| 9,557,588 B2 | 1/2017 | Huitema et al. | |
| 2004/0012849 A1 | 1/2004 | Cruz-Uribe et al. | |
| 2005/0052624 A1 | 3/2005 | Chiang et al. | |
| 2006/0119625 A1* | 6/2006 | Hunt | G09G 3/2003 345/690 |
| 2006/0209213 A1 | 9/2006 | Baker | |
| 2008/0165292 A1 | 7/2008 | Bing et al. | |
| 2010/0328223 A1* | 12/2010 | Mockarram-Dorri | G06F 1/1616 345/173 |
| 2011/0019914 A1 | 1/2011 | Bimber et al. | |
| 2014/0035919 A1* | 2/2014 | Majumder | G09G 3/007 345/428 |
| 2017/0205977 A1* | 7/2017 | Fertik | G06F 3/0483 |
| 2018/0051865 A1* | 2/2018 | Cui | G03B 33/08 |
| 2020/0143536 A1* | 5/2020 | Kuchenbecker | G09G 3/2003 |

FOREIGN PATENT DOCUMENTS

| | | |
|---|---|---|
| CN | 101079239 | 11/2007 |
| CN | 102193291 | 9/2011 |
| CN | 102455562 | 5/2012 |
| CN | 104678553 | 6/2015 |
| CN | 106292102 | 1/2017 |
| EP | 1136874 | 3/2000 |
| EP | 1640776 | 3/2006 |
| GB | 2349481 | 11/2000 |
| JP | 2008032925 A | 2/2008 |
| WO | WO2017061586 A1 | 4/2017 |

* cited by examiner

IMAGE PROJECTION

BACKGROUND

Electronic devices, such as personal computers, may have a projector which can project an image on a surface. The image may be projected for a mere display or for further processing by a user. The surface on which the image is projected may be a touch-sensitive surface through which the user can provide inputs for processing the image.

BRIEF DESCRIPTION OF DRAWINGS

The following detailed description references the drawings, wherein.

DETAILED DESCRIPTION

Projectors project an image by transmitting light associated with the image onto a surface. A projector, such as a digital linear processing (DLP) projector, may include a light source and color filters to generate light of various colors. The gray scale of colors can be controlled by varying the intensity of light. The projector may be coupled to a computer, to receive a signal associated with an image to be projected, and accordingly generate and transmit light of colors associated with the image so as to project the image on a surface.

The surface on which the image is projected is generally white in color. A color of the image projected by the projector may not appear to be the true color on the white colored surface due to presence of ambient light. Since a colored portion of the projected image does not appear of the true color, the projected image may lack in display sharpness and display contrast. For example, the projector, such as a DLP projector, generally projects black colored portions of an image by not transmitting light for those portions. Thus, the black colored portions of the projected image may not appear to be of true black color in the ambient light. As a result, the projected image may lack the display sharpness and display contrast.

The present subject matter describes approaches for projecting images on reflective displays. The reflective displays may be electrophoretic displays, such as, electronic-paper displays. The approaches of the present subject matter facilitate in enhancing the display sharpness and the display contrast of the projected images.

According to an example implementation of the present subject matter, an image is projected on a reflective display by a projector. Upon projecting the image, regions of the projected image that reflect a first predefined color are identified. The first predefined color may, for example, be a color that contributes to the display sharpness and display contrast of the projected image. Upon identifying such regions of the projected image, pixels of the reflective display that overlap the identified regions are biased to display a second predefined color by those pixels. In an example, the second predefined color may be the same as the first predefined color or a color darker than the first predefined color. In an example implementation, the other pixels of the reflective display, i.e., pixels that do not overlap the identified regions, may be biased to display a third predefined color by those non-overlapping pixels. In an example, the third predefined color may be white color.

The combination of the projected image and the selective display of the second predefined color by the pixels of the reflective display, lying within the region of the first predefined color of the projected image, facilitates in enhancing the display sharpness and display contrast of the image.

The present subject matter is further described with reference to the accompanying figures. Wherever possible, the same reference numerals are used in the figures and the following description to refer to the same or similar parts. It should be noted that the description and figures merely illustrate principles of the present subject matter. It is thus understood that various arrangements may be devised that, although not explicitly described or shown herein, encompass the principles of the present subject matter. Moreover, all statements herein reciting principles, aspects, and examples of the present subject matter, as well as specific examples thereof, are intended to encompass equivalents thereof.

Figure 1:
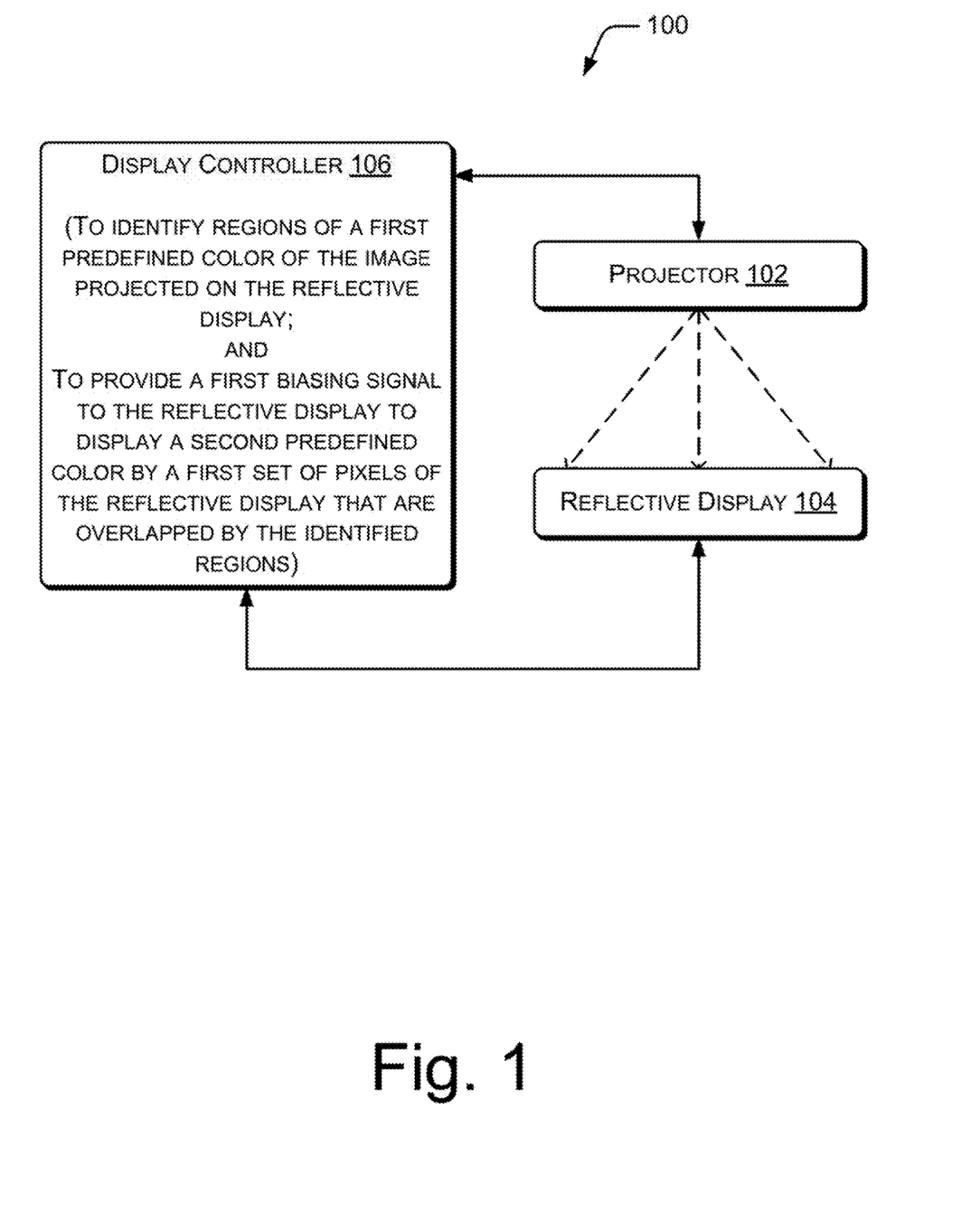
FIG. 1 illustrates a block diagram of a system for displaying an image, according to an example of the present subject matter.

FIG. 1 illustrates a block diagram of a system 100 for displaying an image, according to an example of the present subject matter. The system 100 may be implemented as a computer, for example a desktop computer, a laptop, and the like.

The system 100, as shown, includes a projector 102 and a reflective display 104. In an example, the projector 102 may be a DLP projector. The projector 102 may include a light source, color filters, and optics, for generating and transmitting light of various colors. The reflective display 104 may be an electrophoretic display, for example, an electronic-paper display. The reflective display 104 may include pixels, where each pixel has electrically charged pigments of different colors. Each of the pixels of the reflective display 104 can be electrically biased individually to display a particular color by the respective pixel. In an example implementation, the reflective display 104 may be a touch-sensitive electrophoretic display.

The system 100 further includes a display controller 106. The display controller 106 can be implemented through a combination of any suitable hardware and computer-readable instructions. The display controller 106 may be implemented in a number of different ways to perform various functions for the purposes of displaying or projecting images on the reflective display 104. For example, the computer-readable instructions for the display controller 106 may be processor-executable instructions stored in a non-transitory computer-readable storage medium, and the hardware for the display controller 106 may include a processing resource (e.g., processor(s)), to execute such instructions. In the present examples, the non-transitory computer-readable storage medium stores instructions which, when executed by the processing resource, implements the display controller 106. The system 100 may include the non-transitory computer-readable storage medium storing the instructions and the processing resource (not shown) to execute the instructions. In an example, the non-transitory computer-readable storage medium storing the instructions may be external, but accessible to the processing resource of the system 100. In another example, the display controller 106 may be implemented by electronic circuitry.

The processing resource of the system 100 may be implemented as microprocessors, microcomputers, microcontrollers, digital signal processors, central processing units, state machines, logic circuitries, and/or any devices that manipulate signals based on operational instructions. Among other capabilities, the processing resource may fetch and execute computer-readable instructions stored in a non-transitory computer-readable storage medium coupled to the processing resource of the system 100. The non-transitory computer-readable storage medium may include, for example, volatile memory (e.g., RAM), and/or non-volatile memory (e.g., EPROM, flash memory, NVRAM, memristor, etc.).

In an example implementation, the projector 102 and the reflective display 104 are communicatively coupled with the display controller 106. The projector 102 and the reflective display 104 may be coupled to the display controller 106 through a wired communication link or a wireless communication link. The system 100 may include interfaces (not shown) for the purpose of coupling the projector 102 and the reflective display 104 with the display controller 106. In an example implementation, the interfaces may include Bluetooth® transmitters and receivers, Universal Serial Bus (USB) ports, and the like.

For the purpose of displaying an image on the reflective display 104, the projector 102 may receive a signal associated with the image. The signal may be received from the display controller 106. The projector 102 accordingly generates and transmits light of colors associated with the image. The light from the projector 102 is made incident on the reflective display 104, which results in the image being projected on the reflective display 104.

Upon projecting the image on the reflective display 104, the display controller 106 identifies regions of a first predefined color of the projected image. A procedure to identify the regions of the first predefined color of the projected image is described with reference to the description of FIGS. 2(a)-2(b). The first predefined color may be a color that contributes to the display sharpness and display contrast of the projected image. In an example, the first predefined color may be a color darker than a predefined shade of gray. In an example, the first predefined color may be any color, such as, red, green, blue, or yellow.

Upon identifying the regions of the first predefined color of the projected image, the display controller 106 provides a first biasing signal to the reflective display 104. The first biasing signal is provided to a first set of pixels of the reflective display 104 that are overlapped by the identified regions such that a second predefined color is displayed by the first set of pixels. The first set of pixels herein is the pixels of the reflective display 104 that lie under the regions of the first predefined color of the projected image. The second predefined color may be the same as the first predefined color or a color darker than the first predefined color. In an example, in the case of the first predefined color being darker than a predefined shade of gray, the second predefined color may be black.

Further, in an example implementation, the display controller 106 may provide a second biasing signal to the reflective display 104 to display a third predefined color by a second set of pixels of the reflective display 104 that are not overlapped by the identified regions. The second set of pixels herein are the pixels of the reflective display 104 that do not lie under the regions of the first predefined color of the projected image. In an example, the third predefined color may be white.

Display of the same color or a darker color by the pixels of the reflective display 104 from below the region of the first predefined color of the projected image facilitates in negating the effect of ambience, thereby enhancing the display sharpness and the display contrast of the projected image.

Although, the description herein is described with respect to identification of regions of one predefined color and display of the same or a darker color by the pixels of the reflective display under the identified region, the procedure can be implemented in a similar manner for regions of more than one predefined color.

Figure 2A:
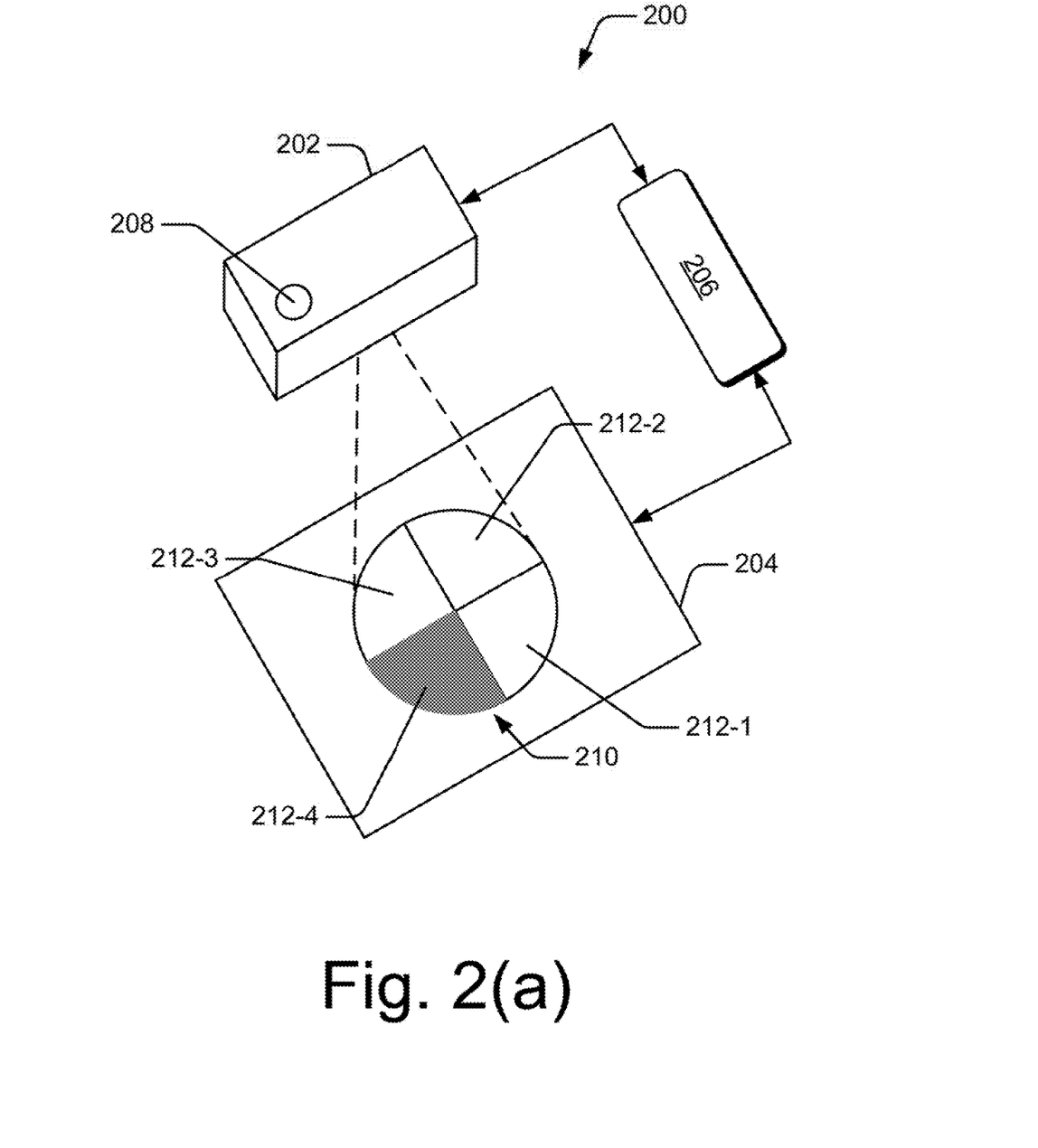
FIGS. 2(a)-2(b) illustrate image projection by a system, according to an example of the present subject matter.
Figure 2B:
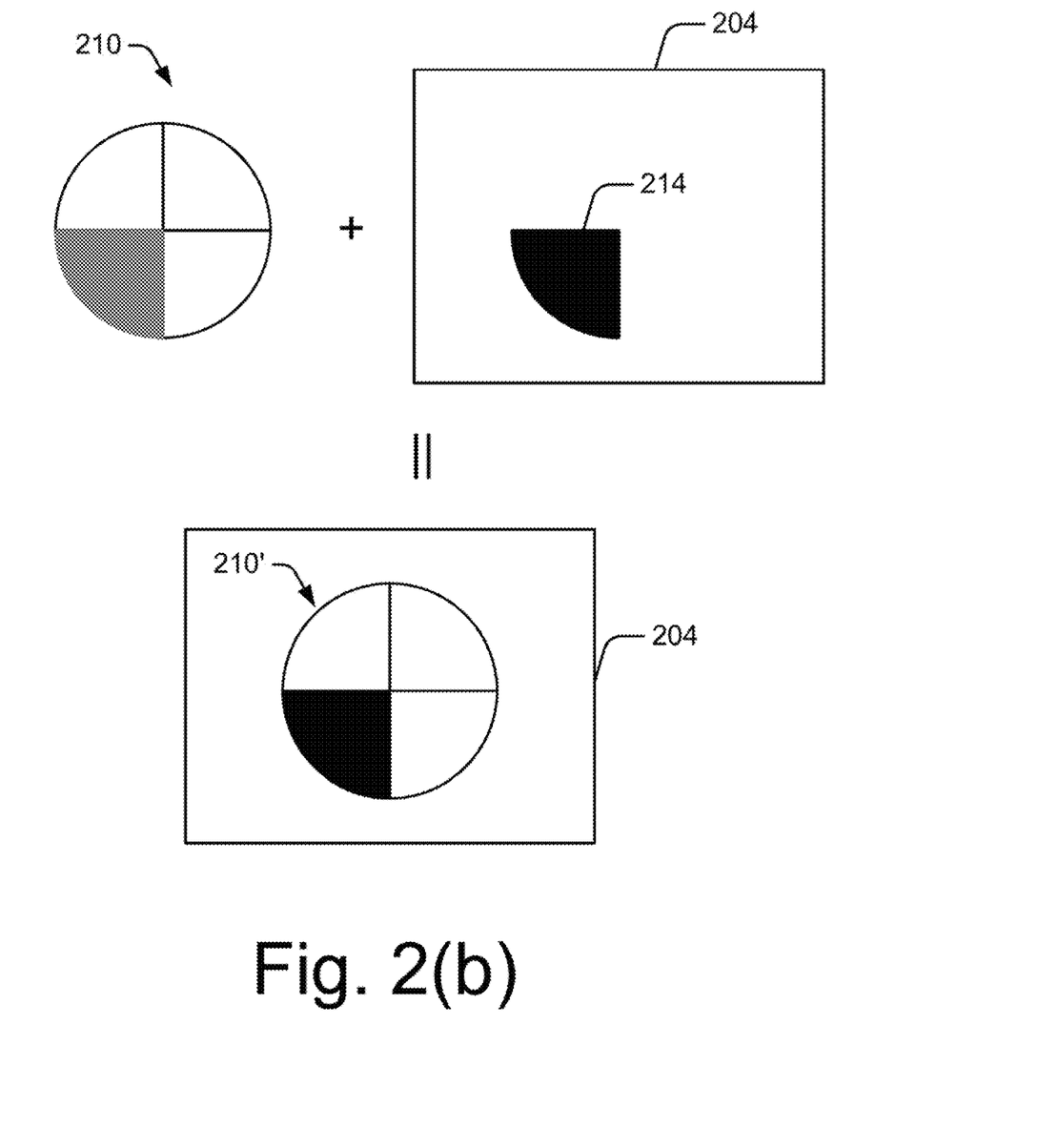

FIGS. 2(a)-2(b) illustrate image projection by a system 200, according to an example of the present subject matter. The system 200, as shown, includes a projector 202 and a reflective display 204. The projector 202 and the reflective display 204 may be similar to the projector 102 and the reflective display 104, respectively, of the system 200. The system 200 also includes a display controller 206 similar to the display controller 106 of the system 100, as described earlier. The display controller 206 may be implemented in a number of different ways to perform various functions for the purposes of displaying or projecting images on the reflective display 204. The projector 202 and the reflective display 204 may be coupled to the display controller 206 through a wired communication link or a wireless communication link.

Further, as shown in FIG. 2(a), the projector 202 includes an imaging unit 208. In an example, the imaging unit 208 may be a single camera or a combination of multiple cameras. The projector 202 may be positioned with respect to the reflective display 204 such that the imaging unit 208 can capture a snapshot of the surface of the reflective display 204.

The description hereinafter describes a procedure of projecting an image on the reflective display 204, in accordance with an example implementation. It may be noted that the system 200 may also include other components (not shown) for processing, storing, and displaying images. The components may, for example, include processing resource(s) and memory. The image to be projected may be stored in a memory of the system 200. Further, the procedure is described herein for a case where the first predefined color is a color darker than a predefined shade of gray, the second predefined color is black, and the third predefined color is white.

For projecting an image, the projector 102 receives from the display controller 206 a signal associated with the image. The projector 202 processes the received signal and generates light of various colors in accordance with the colors present in the image. The projector 202 transmits the generated light onto the reflective display 204 to project the image on the reflective display 204.

FIG. 2(a) shows an example of an image 210 being projected by the projector 202 on the reflective display 204. The example image 210, as shown, is a circle with regions 212-1, 212-2, 212-3, and 212-4 of different colors. The regions 212-1, 212-2, and 212-3 may be of red, blue, and green colors, respectively. The region 212-4 may be of a color darker than a predefined shade of gray. In an example, predefined shade of gray may be 80% or more gray.

Upon projecting the image 210 on the reflective display 104, the imaging unit 208 of the projector 202 captures a snapshot of the image 210 projected on the reflective display 204. The display controller 206 may provide an image capturing signal to the imaging unit 208 to capture the snapshot of the image 210. The imaging unit 208 provides the captured snapshot of the image 210 to the display controller 206.

The display controller 106, upon receiving the snapshot from the imaging unit 208, processes the snapshot and identifies regions of the first predefined color of the snapshot. With reference to FIG. 2(a), the display controller 206 identifies the region 212-4.

Upon identifying the regions of the first predefined color, the display controller 206 provides a first biasing signal to the reflective display 204 to display the second predefined color by a first set of pixels of the reflective display 104 that are overlapped by the identified regions. FIG. 2(b) shows the first set of pixels 214 of the reflective display 204 that lie under the identified region 212-4 of the projected image 210. The first set of pixels 214 is biased to display black color.

Further, the display controller 206 provides a second biasing signal to the reflective display 204 to display the third predefined color by a second set of pixels of the reflective display 204 that are not overlapped by the identified regions. With reference to FIG. 2(b), the second set of pixels is the remaining pixels of the reflective display 204, other than the first set of pixels 214. In an example implementation, the first biasing signal and the second biasing signal are of opposite polarities. The second set of pixels is biased to display white color.

As shown in FIG. 2(b), the combination of the image 210 projected by the projector 202 and the display from the reflective display 204 leads to a resultant image 210'. The resultant image 210' has a higher display sharpness and a higher display contrast in comparison to the image 210 projected by the projector 202.

In an example implementation, dark gray regions that are identified based on the projected image may be representative of black colored regions of the image to be projected. The black colored regions of the image are projected by not transmitting any light for those regions. Such regions on the projected image therefore may appear to be dark gray in the ambient light. Displaying black color through the pixels of the reflective display 204 under such regions enables enhancement of the display sharpness and display contrast in the resultant image.

In an example implementation, the resolution of the projector 102, 202 of the system 100, 200 may be the same as the resolution of the pixels of the reflective display 104, 204.

Figure 3:
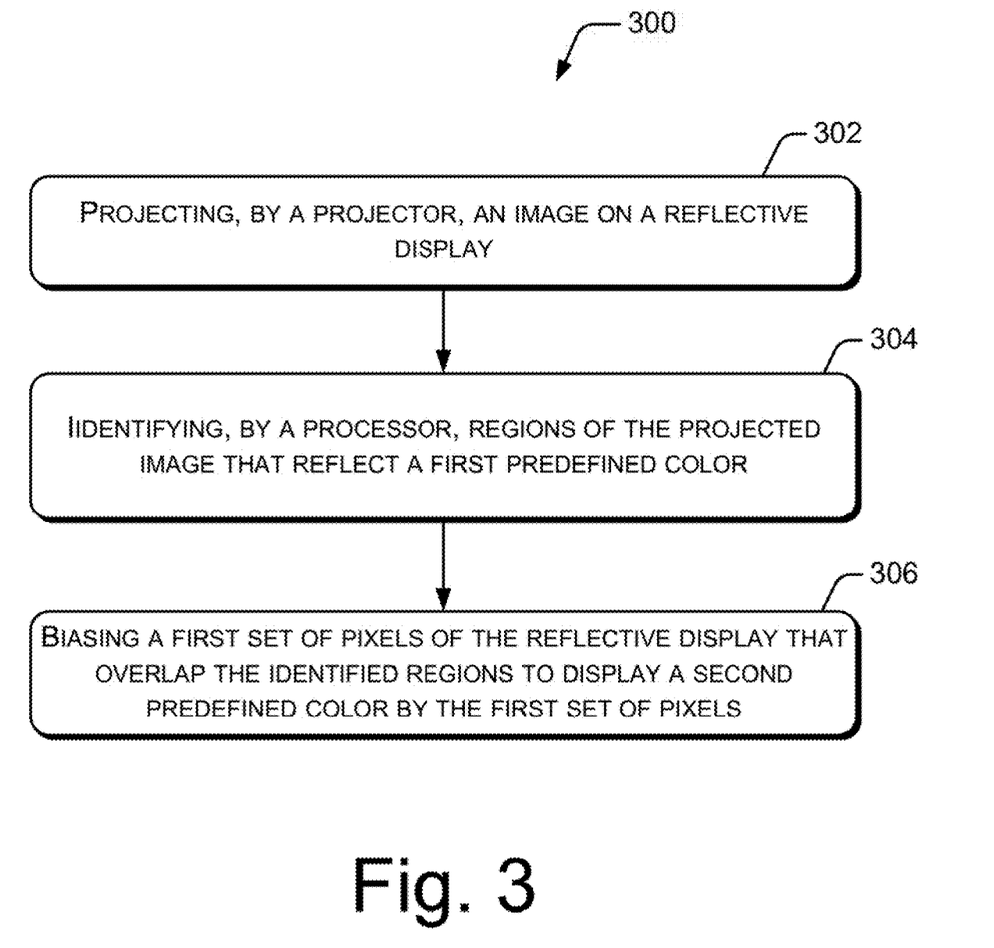
FIG. 3 illustrates a method of displaying an image, according to an example of the present subject matter.

FIG. 3 illustrates a method 300 of displaying an image, according to an example of the present subject matter. The method 300 can be implemented by processor(s) or device(s) through any suitable hardware, a non-transitory machine-readable medium, or a combination thereof. Further, although the method 300 is described in context of the aforementioned system 100, other suitable devices or systems may be used for execution of the method 300. In some example implementations, processes involved in the method 300 can be executed based on instructions stored in a non-transitory computer-readable medium. The non-transitory computer-readable medium may include, for example, digital memories, magnetic storage media, such as a magnetic disks and magnetic tapes, hard drives, or optically readable digital data storage media.

Referring to FIG. 3, at block 302, an image is projected on a reflective display 104. The image is projected by a projector 102 of the system 100. An input signal associated with the image may be provided to the projector 102 to project the image. The input signal associated with the image may be provided by a display controller 106 of the system 100.

At block 304, regions of the projected image that reflect a first predefined color are identified. In an example, the first predefined color is darker than a predefined shade of gray. Such regions may be identified by a processor of the system 100. The processor may be a processing resource associated with the display controller 106 for displaying the image.

In an example implementation, the regions reflecting the first predefined color are identified based on a snapshot of the projected image captured by an imaging unit of the projector. The imaging unit may include a camera. For capturing the snapshot, an image capturing signal may be provided by the processor to the imaging unit of the projector. Accordingly, the snapshot of the projected image is captured by the imaging unit. The captured snapshot is then provided to the processor. After the snapshot is received, snapshot is processed and the regions of the first predefined color of the snapshot are determined by the processor.

Further, at block 306, a first set of pixels of the reflective display 104 that overlap the identified regions is biased to display a second predefined color by the first set of pixels. In an example implementation, a first biasing signal is provided by the processor to the reflective display. The first biasing signal is provided to the first set of pixels of the reflective display 104 such that the first set of pixels display the second predefined color. In an example, the second predefined color is black.

Further, in an example implementation, a second set of pixels of the reflective display 104 that do not overlap the identified regions may be biased to display a third predefined color by the second set of pixels. The second set of pixels of the reflective display 104 may be the remaining pixels other than the first set of pixels. In an example implementation, a second biasing signal is provided by the processor to the reflective display. The second biasing signal is provided to the second set of pixels of the reflective display 104 such that the second set of pixels display the third predefined color. In an example, the third predefined color is white.

Figure 4:
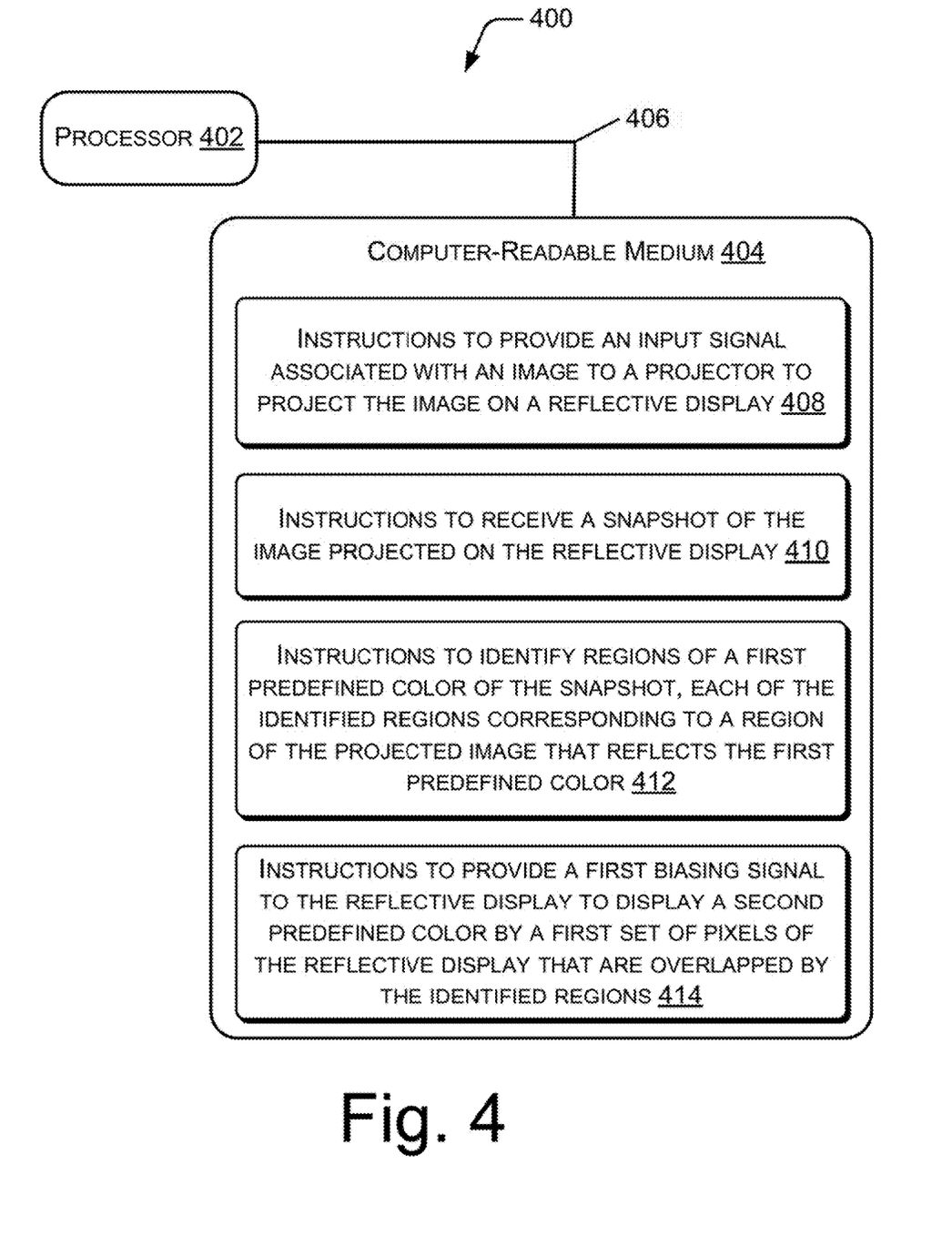
FIG. 4 illustrates a system environment implementing a non-transitory computer-readable medium for projecting an image, according to an example of the present subject matter.

FIG. 4 illustrates a system environment 400 implementing a non-transitory computer-readable medium for projecting an image, according to an example of the present subject matter. The system environment 400 includes a processor 402 communicatively coupled to the non-transitory computer-readable medium 404 through a communication link 406. In an example, the processor 402 may be a processing resource of a system for fetching and executing computer-readable instructions from the non-transitory computer-readable medium 404. The system may be the system 200 as described with reference to FIG. 2.

The non-transitory computer-readable medium 404 can be, for example, an internal memory device or an external memory device. In an example implementation, the communication link 406 may be a direct communication link, such as any memory read/write interface. In another example implementation, the communication link 406 may be an indirect communication link, such as a network interface. In such a case, the processor 402 can access the non-transitory computer-readable medium 404 through a communication network (not shown).

In an example implementation, the non-transitory computer-readable medium 404 includes a set of computer-readable instructions for projecting an image on a reflective display 204 using a projector 202 of the system 200. The set of computer-readable instructions can be accessed by the processor 402 through the communication link 406 and subsequently executed to perform acts for projecting an image.

Referring to FIG. 4, in an example, the non-transitory computer-readable medium 404 may include instructions 408 to provide an input signal associated with an image to the projector 202 to project the image on the reflective display 204. As described earlier, the projector 202 projects the image on the reflective display 204 based on the received input signal.

The non-transitory computer-readable medium 404 may include instructions 410 to receive a snapshot of the image projected on the reflective display 204. In an example implementation, the non-transitory computer-readable medium 404 may include instructions to provide an image capturing signal to an imaging unit 208 of the projector 202 to capture the snapshot of the image projected on the reflective display 204. The imaging unit 208 may accordingly capture the snapshot and provide the snapshot.

The non-transitory computer-readable medium 404 may include instructions 412 to identify regions of a first predefined color of the snapshot. Each of the identified regions corresponds to a region of the projected image that reflects the first predefined color. In an example, the first predefined color is a color darker than a predefined shade of gray.

The non-transitory computer-readable medium 404 may include instructions 414 to provide a first biasing signal to the reflective display 204 to display a second predefined color by a first set of pixels of the reflective display 204 that are overlapped by the identified regions. In an example, the second predefined color is black.

Further, in an example implementation, the non-transitory computer-readable medium 404 may include instructions to provide a second biasing signal to the reflective display 204 to display a third predefined color by a second set of pixels of the reflective display 204 that are not overlapped by the identified regions. The second biasing signal may have a polarity opposite to a polarity of the first biasing signal. In an example, the third predefined color is white.

Although examples for the present disclosure have been described in language specific to structural features and/or methods, it is to be understood that the appended claims are not limited to the specific features or methods described herein. Rather, the specific features and methods are disclosed and explained as examples of the present disclosure.

We claim:

1. A method of displaying an image, comprising:
    projecting, by a projector, the image on a reflective display comprising a plurality of pixels, wherein each respective pixel of the plurality of pixels comprises sub-components of different colors and is electrically biased individually to control a color displayed by the respective pixel;
    identifying, by a processor, regions of the projected image that reflect a first predefined color;
    identifying, by the processor, a first set of pixels of the reflective display that overlaps the identified regions of the projected image; and
    biasing the first set of pixels that overlaps the identified regions to display a second predefined color by the first set of pixels, wherein the biasing of the first set of pixels of the reflective display comprises adjusting electrical biasing of the sub-components of the different colors of each pixel of the first set of pixels.

2. The method of claim 1, comprising biasing a second set of pixels of the reflective display that do not overlap the identified regions to display a third predefined color by the second set of pixels.

3. The method of claim 1, wherein the identifying of the regions of the projected image comprises:
    capturing, by an imaging unit, a snapshot of the projected image; and
    determining, by the processor, regions of the first predefined color of the snapshot.

4. The method of claim 1, wherein the first predefined color is darker than a predefined shade of gray, and wherein the second predefined color is black.

5. The method of claim 2, wherein the third predefined color is white.

6. A system comprising:
    a reflective display comprising a plurality of pixels, wherein each respective pixel of the plurality of pixels comprises sub-components of different colors and is electrically biased individually to control a color displayed by the respective pixel;
    a projector to transmit light associated with an image to project the image on the reflective display; and
    a display controller to:
        identify regions of a first predefined color of the image projected on the reflective display; and
        provide a first biasing signal to the reflective display to display a second predefined color by a first set of pixels of the reflective display, the first set of pixels being overlapped by the identified regions, wherein the first biasing signal adjusts electrical biasing of the sub-components of the different colors of each pixel of the first set of pixels,
    wherein the first predefined color is darker than a predefined shade of gray, and wherein the second predefined color is black.

7. A system comprising:
    a reflective display comprising a plurality of pixels, wherein each respective pixel of the plurality of pixels comprises sub-components of different colors and is electrically biased individually to control a color displayed by the respective pixel;
    a projector to transmit light associated with an image to project the image on the reflective display; and
    a display controller to:
        identify regions of a first predefined color of the image projected on the reflective display,
        provide a first biasing signal to the reflective display to display a second predefined color by a first set of pixels of the reflective display, the first set of pixels being overlapped by the identified regions, wherein the first biasing signal adjusts electrical biasing of the sub-components of the different colors of each pixel of the first set of pixels, and
        provide a second biasing signal to the reflective display to display a third predefined color by a second set of pixels of the reflective display, the second set of pixels not overlapped by the identified regions.

8. The system of claim 7, wherein the first biasing signal and the second biasing signal are of opposite polarities.

9. The system of claim 6, wherein the projector comprises an imaging unit to:
    capture a snapshot of the image projected on the reflective display; and
    provide the snapshot to the display controller.

10. The system of claim 9, wherein the display controller is to:
 receive the snapshot from the imaging unit; and
 determine the regions of the first predefined color of the snapshot.

11. The system of claim 7, wherein the first predefined color is darker than a predefined shade of gray, and wherein the second predefined color is black.

12. The system of claim 6, wherein the reflective display is a touch-sensitive electrophoretic display.

13. A non-transitory computer-readable medium comprising computer-readable instructions, which, when executed by a processor, cause the processor to:
 provide an input signal associated with an image to a projector to project the image on a reflective display comprising a plurality of pixels, wherein each respective pixel of the plurality of pixels comprises sub-components of different colors and is electrically biased individually to control a color displayed by the respective pixel;
 receive a snapshot of the image projected on the reflective display;
 identify regions of a first predefined color of the snapshot, each of the identified regions corresponding to a region of the projected image that reflects the first predefined color; and
 provide a first biasing signal to the reflective display to display a second predefined color by a first set of pixels of the reflective display that are overlapped by the identified regions, wherein the first biasing signal adjusts electrical biasing of the sub-components of the different colors of each pixel of the first set of pixels.

14. The non-transitory computer-readable medium of claim 13, wherein the computer-readable instructions which, when executed by the processor, cause the processor to:
 provide a second biasing signal to the reflective display to display a third predefined color by a second set of pixels of the reflective display that are not overlapped by the identified regions.

15. The non-transitory computer-readable medium of claim 13, wherein the computer-readable instructions which, when executed by the processor, cause the processor to:
 provide an image capturing signal to an imaging unit of the projector to capture the snapshot of the image projected on the reflective display.

16. The method of claim 1, wherein the sub-components of the different colors comprise electrically charged pigments of the different colors.

17. The system of claim 6, wherein the sub-components of the different colors comprise electrically charged pigments of the different colors.

18. The system of claim 11, wherein the third predefined color is white.

19. The system of claim 7, wherein the sub-components of the different colors comprise electrically charged pigments of the different colors.

20. The non-transitory computer-readable medium of claim 13, wherein the first predefined color is darker than a predefined shade of gray, and wherein the second predefined color is black.

* * * * *